United States Patent [19]

Schader et al.

[11] Patent Number: 5,663,512

[45] Date of Patent: Sep. 2, 1997

[54] HARDFACING COMPOSITION FOR EARTH-BORING BITS

[75] Inventors: Kevin W. Schader, Spring; Ronald L. Jones, Cleveland; James L. Overstreet, Webster; Danny E. Scott, Montgomery; Mou-Chih Lu; Alan J. Massey, both of Houston, all of Tex.

[73] Assignee: Baker Hughes Inc., Houston, Tex.

[21] Appl. No.: 343,005

[22] Filed: Nov. 21, 1994

(Under 37 CFR 1.47)

[51] Int. Cl.$^6$ ............................................. C22C 29/00
[52] U.S. Cl. ........................ 75/239; 75/240; 75/242
[58] Field of Search ............................ 75/239, 240, 242, 75/252

[56] References Cited

U.S. PATENT DOCUMENTS

| | | | |
|---|---|---|---|
| 2,033,594 | 3/1936 | Stoody | 262/33 |
| 2,407,642 | 9/1946 | Ashworth | 76/108 |
| 2,660,405 | 11/1953 | Scott et al. | 255/347 |
| 3,158,214 | 11/1964 | Wisler et al. | 175/375 |
| 3,260,579 | 7/1966 | Scales et al. | 29/195 |
| 3,768,984 | 10/1973 | Foster, Jr. | 29/182.8 |
| 3,800,891 | 4/1974 | White et al. | 175/374 |
| 3,989,554 | 11/1976 | Wisler | 285/333 |
| 4,043,611 | 8/1977 | Wallace | 38/4 A |
| 4,262,761 | 4/1981 | Crow | 175/374 |
| 4,414,029 | 11/1983 | Newman et al. | 75/252 |
| 4,455,278 | 6/1984 | van Nederveen et al. | 419/6 |
| 4,499,958 | 2/1985 | Radtke et al. | 175/329 |
| 4,562,892 | 1/1986 | Ecer | 175/371 |
| 4,597,456 | 7/1986 | Ecer | 175/371 |
| 4,611,673 | 9/1986 | Childers et al. | 175/340 |
| 4,630,692 | 12/1986 | Ecer | 175/330 |
| 4,666,797 | 5/1987 | Newman et al. | 428/681 |
| 4,726,432 | 2/1988 | Scott et al. | 175/385 |
| 4,762,028 | 8/1988 | Regan | 76/108 |
| 4,781,770 | 11/1988 | Kar | 148/16.5 |
| 4,836,307 | 6/1989 | Keshavan et al. | 175/374 |
| 4,884,477 | 12/1989 | Smith et al. | 76/108 |
| 4,944,774 | 7/1990 | Keshavan et al. | 51/309 |
| 5,038,640 | 8/1991 | Sullivan et al. | 76/108.2 |
| 5,051,112 | 9/1991 | Keshavan et al. | 51/309 |
| 5,089,182 | 2/1992 | Findeisen et al. | 264/8 |
| 5,152,194 | 10/1992 | Keshavan et al. | 76/108.1 |
| 5,291,807 | 3/1994 | Vanderford et al. | 76/108.2 |
| 5,492,186 | 2/1996 | Overstreet et al. | 175/374 |

FOREIGN PATENT DOCUMENTS

| | | | |
|---|---|---|---|
| 1070039 | 5/1967 | United Kingdom | C22C 29/00 |
| 2104101A | 3/1982 | United Kingdom | |

OTHER PUBLICATIONS

British Search Report dated Jan. 24, 1996.

*Primary Examiner*—Ngoclan Mai
*Attorney, Agent, or Firm*—Mark D. Perdue; Robert A. Felsman

[57] ABSTRACT

A hardfacing composition comprises at least 60% by weight of hard metal granules including a quantity of sintered carbide pellets and a quantity of cast carbide pellets. The cast and sintered carbides are selected from the group of carbides consisting of chromium, molybdenum, niobium, tantalum, titanium, tungsten, and vanadium carbides and alloys and mixtures thereof. The balance of the hardfacing composition is matrix metal with traces of flux or deoxidizer, and alloying elements. All percentages given are pre-application ratios.

18 Claims, 3 Drawing Sheets

HARDFACING COMPOSITION FOR EARTH-BORING BITS

BACKGROUND OF THE INVENTION

1. Field of the Invention

The present invention relates to the composition of hardfacing materials applied to surfaces subjected to abrasive wear to increase their wear resistance. More particularly, the present invention relates to hardfacing compositions applied to one or more surfaces of an earth-boring bit of the rolling cutter variety.

2. Background Information

It is a long-standing practice in the design and manufacture of earth-boring bits to apply wear-resistant hardfacing materials to the surfaces of such bits that are subjected to abrasive wear during drilling operations. In earth-boring bits of the rolling cutter variety, these surfaces include the teeth of bits of the milled or steel tooth variety, the gage surfaces of the rolling cutters, and the shirttails of the bit legs comprising the bit body.

In the past, these hardfacing compositions generally comprise carbides of the elements of Groups IVB, VB, and VIB in a matrix metal of iron, cobalt, or nickel and alloys and mixtures thereof. The hardfacing is applied by melting the matrix and a portion of the surface to which the hardfacing is applied with an oxyacetylene or atomic hydrogen torch. The carbide particles give the hardfacing material hardness and wear resistance, while the matrix metal lends the hardfacing fracture toughness. A hardfacing composition must strike an adequate balance between wear resistance (hardness) and fracture toughness. A hardfacing composition that is extremely hard and wear-resistant may lack fracture toughness, causing the hardfacing to crack and flake prematurely. Conversely, a hardfacing with adequate fracture toughness, but inadequate hardness and wear resistance, is eroded prematurely and fails to serve its purpose.

Many factors affect the suitability of a hardfacing composition for a particular application. These factors include the chemical composition and physical structure of the carbides employed in the composition, the chemical composition and microstructure of the matrix metal or alloy, and the relative proportions of the carbide materials to one another and to the matrix metal or alloy.

One early advance in hardfacing compositions for use in earth-boring bits is disclosed in commonly assigned U.S. Pat. No. 3,800,891, Apr. 2, 1974 to White et al. This patent discloses a hardfacing composition comprising sintered tungsten carbide in an alloy steel matrix. Sintered tungsten carbide comprises grains or particles of tungsten carbide sintered with and held together by a binder of non-carbide material, such as cobalt. The sintered tungsten carbide possesses greater fracture toughness than the more conventional cast tungsten carbide, such that the resulting hardfacing composition possesses good fracture toughness without sacrificing hardness and wear resistance.

U.S. Pat. No. 4,836,307, Jun. 6, 1989 to Keshavan et al., discloses a hardfacing composition employing particles of cemented or sintered tungsten carbide and relatively small particles of single crystal monotungsten carbide, sometimes referred to as "macrocrystalline" tungsten carbide, in a mild steel matrix. This composition purports to possess the advantages of sintered tungsten carbide, as disclosed in U.S. Pat. No. 3,800,891, with the advantages of single crystal monotungsten carbide, which is harder than the cemented or sintered tungsten carbide, yet is less brittle than the alternative cast carbide.

U.S. Pat. No. 5,089,182, Feb. 18, 1992, to Findeisen, et al. discloses a method of manufacturing cast carbide pellets that are generally spherical in shape and have improved mechanical and metallurgical properties over prior-art carbide pellets. These cast pellets are not truly spherical, but are sufficiently symmetrical that residual stresses in the pellets are minimized. Also, the generally spherical shape of these pellets eliminates corners, sharp edges, and angular projections, which are present in conventional crushed particles, that increase residual stresses in the particles and tend to melt as the hardfacing composition is applied to the surface.

A need exists, therefore, for a hardfacing composition having a near-optimal balance between wear-resistance and toughness and that incorporates the properties of several types of carbide materials.

SUMMARY OF THE INVENTION

It is a general object of the present invention to provide an improved hardfacing for use in earth-boring bits and other applications having a need for good wear resistance in combination with good fracture toughness.

This and other objects of the present invention are accomplished by providing a hardfacing composition comprising at least 60% by weight of hard metal granules including a quantity of sintered carbide pellets and a quantity of cast carbide pellets. The cast and sintered carbides are selected from the group of carbides consisting of chromium, molybdenum, niobium, tantalum, titanium, tungsten, and vanadium carbides and alloys and mixtures thereof. The balance of the hardfacing composition is matrix metal with traces of flux or deoxidizer, and alloying elements. All percentages given are pre-application ratios.

According to the preferred embodiment of the present invention, the carbide materials are provided in granular form with the balance of the material being matrix metal. The granules comprise about 67–71% by weight of the composition. The sintered carbide pellets comprise about 62.5 to 68.5% by weight of the granules and the cast carbide pellets comprise 12–18% by weight of the granules. Crushed sintered carbide particles comprise about 12–18% by weight of the granules. The sintered carbide pellets range in size between about 16 mesh and 30 mesh and the cast carbide pellets range in size between about 40 mesh and about 80 mesh. The crushed sintered carbide particles range in size between about 20 mesh and about 30 mesh.

According to the preferred embodiment of the present invention, the matrix metal is low-carbon steel alloyed with niobium and is present in the form of a tube containing the granules.

Other objects, features and advantages of the present invention will become apparent with reference to the detailed description, which follows.

DESCRIPTION OF THE PREFERRED EMBODIMENT

Figure 1:
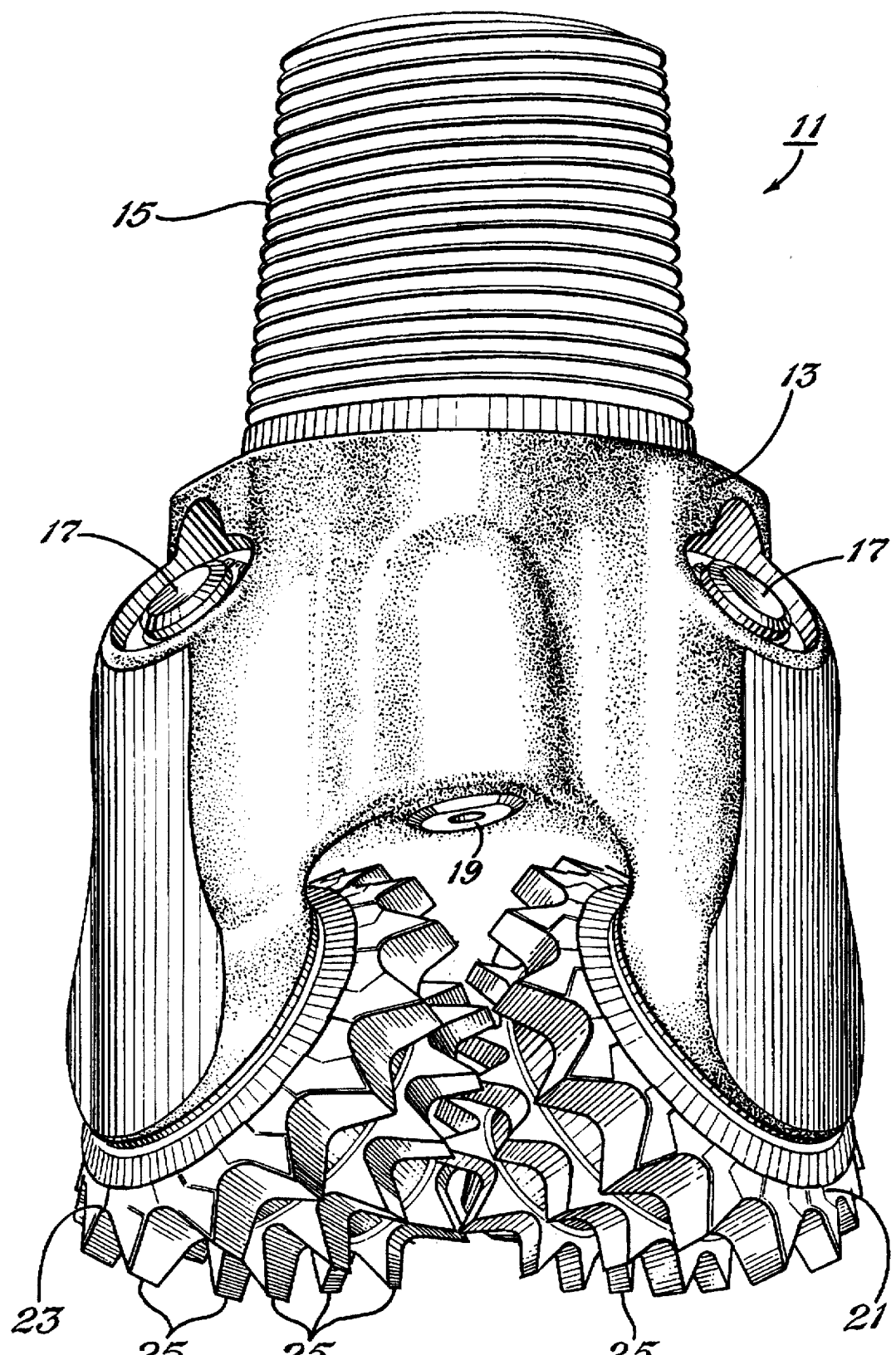
FIG. 1 is a perspective view of an earth-boring bit of the type contemplated by the present invention.

Referring now to the drawings, and specifically to FIG. 1, an earth-boring bit 11 of the type contemplated by the present invention is illustrated. Earth-boring bit 11 includes a bit body, which is threaded at its upper extent 15 for connection onto a drillstring. Each leg of bit body 13 is provided with a lubricant compensator 17, a preferred embodiment of which is disclosed in commonly assigned U.S. Pat. No. 4,727,942, Mar. 1, 1988 to Galle et al. At least one nozzle 19 is provided in bit body 13 to discharge drilling fluid from the interior of the drillstring to cool and lubricate bit 11 and to carry away cuttings generated during drilling. Three cutters 21, 23 (one of which is obscured from view in the perspective of FIG. 1) are rotatably mounted on cantilevered bearing shafts depending from bit body 13. A plurality of cutting elements 25 are formed on each cutter 21, 23. According to the preferred embodiment of the present invention, cutting elements 25 are milled or steel teeth formed from the material of cutters 21, 23.

Conventionally, wear-resistant hardfacing may be applied over cutting elements or teeth 25 to increase their wear-resistance. Hardfacing may also be applied to the shirttail (portion above the cutters 21, 23) of each bit leg forming the bit body 13. Hardfacing may also be applied to the outermost or gage surfaces of cutters 21, 23. These are exemplary surfaces of bit 11 that are subjected to abrasive wear during drilling operation. Hardfacing generally may be applied to any surface of bit 11 that is subjected to abrasive wear.

An improved hardfacing composition that is particularly suitable for application to earth-boring bits 11 is composed of a quantity of sintered carbide pellets in combination with a quantity of cast carbide pellets in a metal matrix. The term "pellet" is used to mean particles of carbide that are generally spherical in configuration. Pellets are not true spheres, but lack the corners, sharp edges, and angular projections commonly found in crushed and other non-spherical carbide grains or particles. These surface irregularities cause the particles to possess residual stresses and may melt during application of the hardfacing composition, degrading the properties of the hardfacing. Generally spherical pellets are believed to have reduced levels of residual stresses and generally do not possess irregularities that are believed to melt during application.

The sintered carbide pellets comprise crystals or particles of tungsten carbide sintered together with a binder, usually cobalt, into the generally spherical pellet configuration. The cast carbide pellets are tungsten carbide grains or particles melted and cast, under controlled conditions, in a generally spherical configuration. The preferred method for manufacturing cast tungsten carbide pellets is disclosed in U.S. Pat. No. 5,089,182, Feb. 18, 1992 to Findeisen et al.

The enhanced fracture toughness of the sintered carbide pellets, together with the hardness and strength of the cast carbide pellets, results in a hardfacing composition having improved wear-resistance and fracture toughness over hardfacing compositions employing crushed carbide particles, sintered pellets or particles, or macrocrystalline or single crystal monotungsten carbide, and combinations thereof.

Tungsten carbide is the preferred carbide for the hardfacing composition according to the present invention. However, cast and sintered pellets of chromium, molybdenum, niobium, tantalum, titanium, and vanadium carbides would be suitable.

According to the preferred embodiment of the present invention, the improved hardfacing composition includes the following materials, in pre-application ratios:

about 41–49% by weight sintered tungsten carbide pellets;

8–12.8% by weight cast tungsten carbide pellets; and

8–12.8% by weight crushed sintered tungsten carbide particles;

a balance of the composition being matrix metal.

According to the preferred embodiment of the present invention, the carbide pellets and particles are in the form of a granular filler in a tube rod of matrix metal. To achieve the above-referenced pre-application ratios, the granular filler comprises 67–71% by weight of the finished tube rod. The granules then comprise the following pre-application ratios:

about 62.5–68.5% by weight sintered tungsten carbide pellets;

about 12–18% by weight spherical cast tungsten carbide; and about 12–18% by weight crushed sintered tungsten carbide.

Also present in the tube rod with the granules is about 2–4% by weight silicomanganese, about 0.4–0.6% by weight niobium and about 0.36% by weight resinox as flux, alloying element, and deoxidizer and binder, respectively. The tube rod carrying the granules is circular in cross-section and is formed of low-carbon steel and has an outer diameter of 0.125 inch, a wall thickness of 0.013 inch, and a length of about 28–30 inches. This tube rod thus comprises 29–33% by weight of the tube rod and granular filler. Preferably, the sintered carbide pellets range in size from ASTM 16 mesh to ASTM 30 mesh. The cast carbide pellets range in size from about ASTM 40 mesh to about ASTM 80 mesh. The crushed sintered carbide ranges in size from about ASTM 20 mesh to about ASTM 30 mesh.

Figure 2:
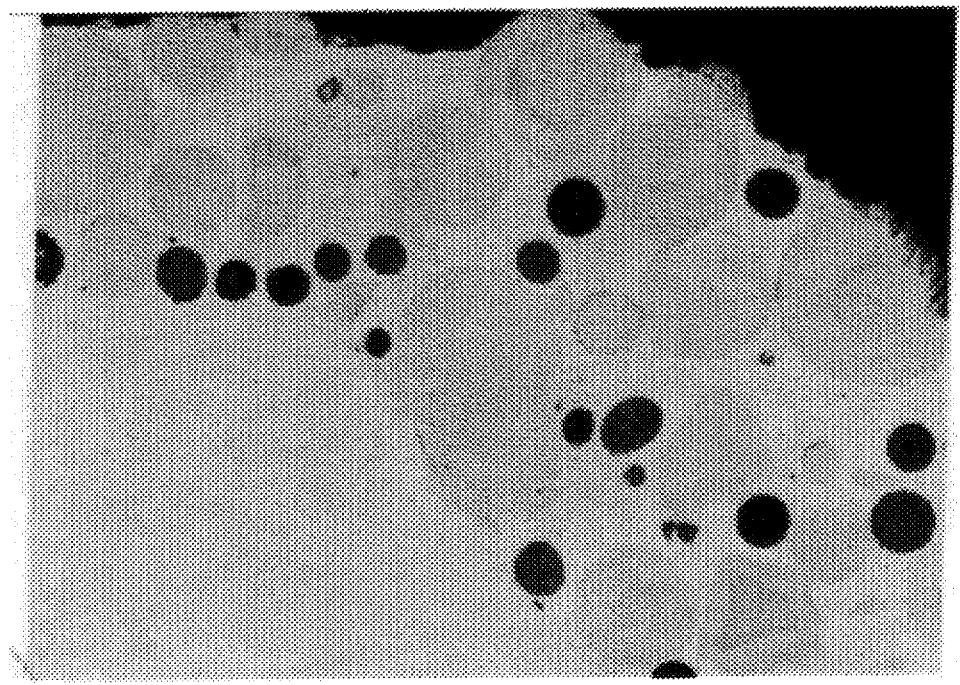
FIG. 2 is a photomicrograph of a section of the applied hardfacing composition according to the present invention.

FIG. 2 is a photomicrograph of a polished and etched section of the hardfacing composition set forth above as applied to a tooth 25 of an earth-boring bit 11. As can be seen, the larger sintered tungsten carbide pellets (gray) comprise the bulk of the hardfacing composition. The interstices or gaps between the larger sintered carbide pellets are filled by the spherical cast carbide pellets (dark gray to black). The larger spherical tungsten carbide pellets, by virtue of their size and larger presence in the composition, expose the largest surface area to abrasive wear. The smaller spherical cast carbide pellets fill the gaps or interstices between the larger sintered pellets, preventing the erosion of matrix metal from between the spherical sintered carbide pellets, thus prolonging the retention of the sintered carbide pellets in the hardfacing. The irregularly shaped crushed sintered carbide particles fill gaps in the matrix metal not otherwise occupied by the spherical sintered carbide pellets and are thought to aid in the weldability of the composition.

Figure 3:
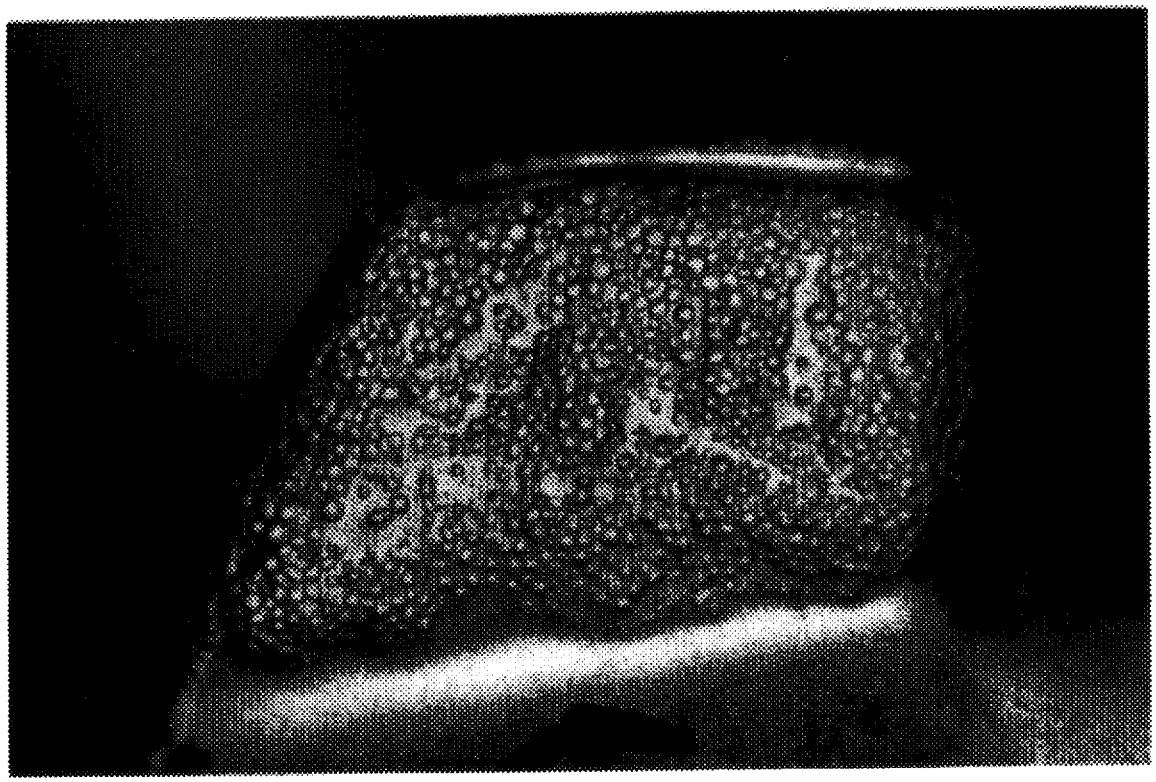
FIG. 3 is a photograph of a worn tooth of an earth-boring bit as shown in FIG. 1, illustrating the wear characteristics of the applied hardfacing composition according to the present invention.
Figure 4:
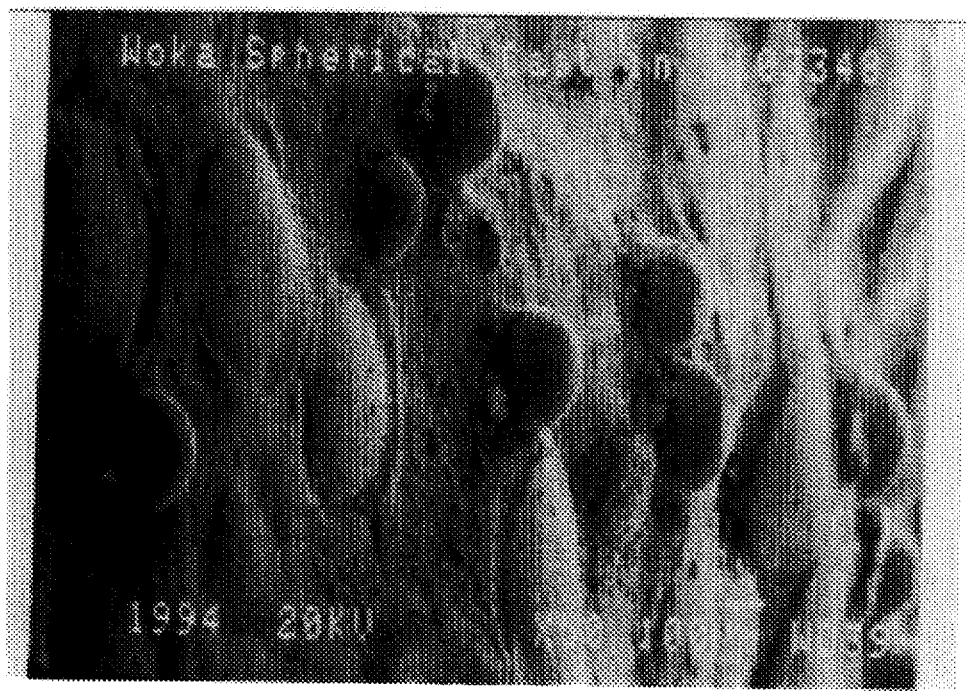
FIG. 4 is a photomicrograph of the surface of worn applied hardfacing composition according to the present invention.

FIG. 3 is a photograph of a worn steel tooth of an earth-boring bit having hardfacing according to the present invention applied thereto. FIG. 4 is a photomicrograph of a surface of a worn steel tooth bit having the hardfacing composition according to the present invention applied thereto. As can be seen, and as was described with reference to FIG. 2, the larger spherical sintered tungsten carbide pellets bear the bulk of the abrasive wear and can be seen to be worn. The smaller spherical cast carbide pellets, having greater hardness and abrasion resistance than the sintered carbide pellets, can be seen between the pellets and are far less worn and stand above the matrix metal. The combination of the larger, tougher spherical sintered carbide pellets with the smaller, harder spherical cast carbide pellets yields a hardfacing composition having improved wear and strength characteristics over conventional hardfacings employing sintered tungsten carbide, crushed cast tungsten carbide, or macrocrystalline tungsten carbide, or combinations thereof.

Following are examples of hardfacing compositions prepared and applied according to the present invention.

EXAMPLE

The following quantities and sizes of granular carbide materials were provided:

Spherical sintered tungsten carbide pellets comprising tungsten carbide particles or grains sintered with a 6% by weight cobalt binder and provided by Kennametal, Inc. of Fallon, Nev., in the following sizes and percentages by weight:

| ASTM Mesh Size | Range | Mean |
|---|---|---|
| +16 | 0–5% | 3% |
| −16/+20 | 40–50% | 47% |
| −20/+30 | 40–50% | 47% |
| −30 | 0–5% | 3% |

Crushed sintered tungsten carbide, also provided by Kennametal, Inc., in the following sizes and percentages by weight:

| ASTM Mesh Size | Range | Mean |
|---|---|---|
| +20 | 0–5% | 3% |
| −20/+30 | 90–100% | 94% |
| −30 | 0–5% | 3% |

Spherical cast carbide pellets, manufactured by WOKA Schweisstechnik GmbH, of Willich, Germany, in the following sizes and percentages by weight:

| ASTM Mesh Size | Range | Mean |
|---|---|---|
| +40 | 0–5% | 3% |
| −40/+60 | 90–100% | 94% |
| −60 | 0–5% | 4% |

The carbide granules were blended, by tumbling in a barrel mill, together with 4% by weight silicomanganese, 0.5% by weight niobium and 0.36% by weight resinox. After the initial blending, alcohol was added and the granules reblended to "wet" the granular filler, followed by a drying step.

Annealed, cold-finished, low-carbon steel strip was cleaned and fed into a conventional tube-forming machine. The granular filler mixture was fed into the machine to fill the tubes. The tubes then were cut to 28–30" lengths and the ends of the tube crimped sealed. The finished tube rod then was baked in an atmosphere of air at 300°–350° F. for a minimum of one hour to insure complete drying of the granular filler. The resulting tube rods comprises 68% by weight of the granular filler and 32% by weight of the tube matrix metal.

A portion of one of the tube rods, prepared as set forth above, was melted to form a sample of the applied hardfacing composition according to the present invention. The sample was weighed and placed in contact with a steel wheel 6.5 inch in diameter and 0.5 inch wide. A force resulting from a 10 kg weight was applied to the sample and the wheel and sample were immersed in a slurry of 30 grit aluminum oxide suspended in deionized water. The wheel was rotated at 100 rpm for 500 revolutions. The test apparatus was similar to that prescribed by the ASTM B611 testing procedure. Generally, the aluminum oxide slurry is rubbed between the wheel and sample, resulting in erosion of the sample. After the test, the sample is weighed to obtain an indication of the quantity of sample material eroded during the test. The amount of material eroded during the test is a relative indication of the wear resistance of the sample material. This test was repeated four times.

The laboratory test results for the samples of the hardfacing composition according to the present invention showed an average of 12% less material eroded and thus a 12% improvement in wear resistance over hardfacing compositions previously tested that did not include the spherical cast carbide pellets in combination with the spherical sintered carbide pellets.

A tube rod of hardfacing composition prepared as set forth above was applied by welding to selected teeth of a Hughes Christensen 9 ⅞ inch ATJ-1S bit similar to that depicted in FIG. 1. Other teeth on the same bit were hardfaced with a hardfacing composition comprising only sintered spherical tungsten carbide pellets in a matrix metal. The hardfacing composition was applied by welding with an oxyacetylene torch, wherein the tube rod matrix metal was melted, along with a portion of the underlying tooth steel, and the resulting applied hardfacing was air cooled. Oxyacetylene welding is preferred to atomic hydrogen welding because the increased temperatures of the atomic hydrogen welding process, unless carefully controlled, melt the matrix metal and tooth steel too quickly, permitting the dense, spherical sintered and cast pellets to "sink" into the tooth steel and away from the surface of the hardfacing. This bit was run in a well in Grimes County, Texas. After 40 hours, the bit drilled 3,392 feet. The bit performance was rated good and comparison revealed that the bit outperformed, in turns of cost-per-foot, the average of the best bits run in offset wells over similar intervals and pulled with a similar dull condition.

The teeth with the hardfacing composition according to the present invention were less worn than the other teeth.

The teeth of another Hughes Christensen 9 ⅞ inch ATJ-1S bit were hardfaced with the composition as set forth above. The bit was run in another well in Grimes County, Texas. After 48.6 hours, the bit drilled 3,273 feet. The bit performance was rated good and the dull condition was much better than that of the best bits run in offset wells over similar intervals, although it did not top their performance in terms of cost-per-foot. The teeth with the hardfacing composition according to the present invention were less worn than the other teeth.

The teeth of a Hughes Christensen 7 ⅞ inch ATJ-1 bit were hardfaced with the composition as set forth above. The bit was run in a well in Carbon County, Wyo. After 55.5 hours, the bit drilled 3,551 feet and was pulled with a better dull condition than the bits run in offset wells over similar intervals. The teeth with the hardfacing composition according to the present invention were less worn than the other teeth.

The teeth of another Hughes Christensen 7 ⅞ inch ATJ-1 were hardfaced with the composition as set forth above. The bit was run in another well in Carbon County, Wyoming. After 42.5 hours, the bit drilled 2,844 feet and was pulled with a better dull condition that the bits run in offset wells over similar intervals. The teeth with the hardfacing composition according to the present invention were less worn than the other teeth.

The laboratory wear resistance testing, combined with the experimental results obtained from bits in the field, indicate that the hardfacing composition according to the present invention is a marked improvement over conventional hardfacing compositions. This improvement is believed to be the result of the combination of the spherical sintered and cast tungsten carbide pellets, which yield a hardfacing composition having a good balance between hardness and fracture toughness.

The invention has been described with reference to specific examples and preferred embodiments thereof. It is thus not limited, but is susceptible to variation and modification without departing from the scope and spirit of the invention.

We claim:

1. An improved, wear-resistant hardfacing composition comprising the following materials in pre-application ratios:
   at least 60% by weight of the composition being granules including a quantity of sintered carbide pellets and a quantity of cast carbide pellets, the cast and sintered carbides being selected from one of the group of carbides consisting of chromium, molybdenum, niobium, tantalum, titanium, tungsten, and vanadium carbides and alloys and mixtures thereof;
   the balance of the hardfacing composition being matrix metal.

2. The improved hardfacing composition according to claim 1 wherein the quantity of sintered carbide pellets is about 65.5% by weight of the granules and the quantity of cast carbide pellets is about 15% by weight of the granules, and the granules further comprise about 15% by weight crushed sintered carbide particles.

3. The improved hardfacing composition according to claim 1 wherein the sintered carbide pellets range in size between about 16 and about 30 mesh.

4. The improved hardfacing composition according to claim 2 wherein the crushed sintered carbide particles range in size between about 20 mesh and about 30 mesh.

5. The improved hardfacing composition according to claim 1 wherein the cast carbide pellets range in size between about 40 mesh and about 80 mesh.

6. The improved hardfacing composition according to claim 1 wherein the matrix metal is selected from the group consisting of nickel, iron, cobalt and alloys and mixtures thereof and a portion of the matrix material is in the form of a tube containing the granules.

7. The improved hardfacing composition according to claim 1 wherein the matrix metal is low-carbon steel alloyed with niobium.

8. An improved earth-boring bit hardfacing composition comprising, in pre-application ratios:
   about 41–49% by weight spherical sintered carbide pellets;
   about 8–12.8% by weight spherical cast carbide pellets;
   about 8–12.8% by weight crushed sintered carbide particles; and
   a balance of the composition matrix metal.

9. The improved hardfacing composition according to claim 8 wherein the spherical sintered carbide pellets range in size between about 16 mesh and about 30 mesh.

10. The improved hardfacing composition according to claim 8 wherein the crushed sintered carbide particles range in size between about 20 mesh and about 30 mesh.

11. The improved hardfacing composition according to claim 8 wherein the spherical cast carbide pellets range in size between about 40 mesh and about 80 mesh.

12. The improved hardfacing composition according to claim 8 wherein the particulate carbide materials are selected from one of the group of carbides consisting of chromium, molybdenum, niobium, tantalum, titanium, tungsten, and vanadium carbides and alloys and mixtures thereof.

13. The improved hardfacing according to claim 8 wherein the matrix metal is low-carbon steel alloyed with niobium.

14. An improved earth-boring bit hardfacing composition comprising, in pre-application ratios:
   about 41–49% by weight spherical sintered tungsten carbide pellets;
   about 8–12.8% by weight spherical cast tungsten carbide pellets;
   about 8–12.8% by weight crushed sintered tungsten carbide particles; and
   a balance of the composition matrix metal in the form of a tube containing the cast and sintered carbide particles and pellets.

15. The improved hardfacing composition according to claim 14 wherein the spherical sintered carbide pellets range in size between about 16 mesh and about 30 mesh.

16. The improved hardfacing composition according to claim 14 wherein the crushed sintered carbide particles range in size between about 20 mesh and about 30 mesh.

17. The improved hardfacing composition according to claim 14 wherein the spherical cast carbide pellets range in size between about 40 mesh and about 80 mesh.

18. The improved hardfacing according to claim 14 wherein the matrix metal is low-carbon steel alloyed with niobium.

* * * * *